Patented June 10, 1930

1,762,294

UNITED STATES PATENT OFFICE

WILLIAM F. GERICKE, OF BERKELEY, CALIFORNIA

FERTILIZING SOLUTION FOR SEED TREATMENT

No Drawing.    Application filed August 11, 1925.    Serial No. 49,640.

This invention relates to the control of plant activities through the application of plant stimulants, nutrients, toxins, etc. directly to the seed of the plants before planting the same.

The objects of my invention are to provide a better method of controlling plant activity for any purpose, such as for size, quantity or quality of product, resistance to disease, etc. than has heretofore been known or used, together with specific formulæ for controlling certain activity as well as the production of an article of manufacture comprising plant seeds treated to effect such controls.

For a clear understanding of the invention, it may be said to be the result of my discoveries that a condition necessary for maximum development of some of the important agronomic plants exists in the absorption of sufficient quantities of certain salt elements during the early growth phase of the plant, and in the absence of one or more of these elements as physiologically available in the culture media during the latter growth phases. This applies among other elements to phosphorus and potassium which are important ingredients in commercial fertilizers.

The result of these discoveries was published by me in two scientific papers, as follows:

(1) The beneficial effect to plant growth of the temporary depletion of some of the essential elements in the soil.—Science 59:321–324, 1924.

(2) The beneficial effect to wheat growth due to depletion of available phosphorus in the culture media.—Science 60:297–298, 1924.

The invention herein claimed deals with successful methods, formulæ, and procedures whereby the principles suggested above or in the papers referred to, are put into practice either as a whole or as a part. The method of practical fertilization, absorption and nutrition of plants through the injection into the seed of certain essential elements usually and heretofore supplied by the soil or by fertilizers added to the soil, is my invention broadly, as well as feasible and practical means whereby fertilizers or other activity modifying agents are supplied to the plants in their early growth stage and incidentally in part precluding them from being absorbed in their latter growth stages when they are not needed or may become relatively harmful.

In treating the seeds either all or part of the amounts of the following elements: phosphorus, potassium, magnesium, and sulfur, which are usually and naturally obtained from the soil through absorption by and entry through the roots into the plant, can be supplied to the plant by proper procedure and treatment of the seeds with chemicals.

The success of the method of salt-nutrition of plants by supplying some of the essential salt elements in the seeds depends on:

(1) That the viability of the seeds be not impaired by treatment.

(2) That the seed contain, attain or be surrounded with a sufficient quantity of the required salt or salts to make for normal and well developed plants.

(3) That the salt elements be supplied or become available to plants in a growth period when most needed. Thus for normal development of wheat, barley, cotton, rice and other plants, phosphorus and potassium are required in available form in the culture media only during their early growth stages.

To successfully and sufficiently impregnate refractory seeds such as those of barley, wheat, cotton, rice and other plants with potassium or phosphorus it is preferable (a) To immerse the seeds in very concentrated solutions of a potassium or phosphorus salt. Concentrated solutions do not impair the viability of seeds as much as do dilute solutions whenever the immersion extends over considerable time such as twenty-four hours or more, on account of the absorption of water being less.

(b) A salt should be used that does not seriously disintegrate the texture of the seeds.

(c) Small quantities of material that possess corrosive action, such as acids or alkalis, should either be contained in the treating solution in order to facilitate the entry of the required salt into the seed and yet not impair its viability, or the slight disintegration of the seed may be produced by pre-treatment, either chemical or mechanical.

(d) The coating of the seeds after treatment with a non-injurious, adhesive material in order to prevent loss of fertilizer or other acitivity controlling agent from the seed in any subsequent manipulation is or may be necessary in many cases.

As one example of treating a seed in carrying out my invention, the method I use to impregnate barley seed with phosphorus is as follows: A quantity of $K_2HPO_4$ and KOH in the proportion of 700 grams to 5.6 grams is dissolved in a liter of water. That is, the mixture is a solution composed of $K_2HPO_4$, four molal concentration and KOH one-tenth molal concentration. It will be noted that this degree of concentration imparts to the solution a higher specific gravity than that of the barley, and in connection with other seeds the concentration should be sufficiently strong to cause the seed to float in the solution. Seeds of barley are immersed in this solution for twenty-four hours, then removed, drained, and while wet are coated with plaster of Paris. The mass is stirred or agitated for a brief time so as to obtain uniform contact of seeds and plastic material and also to prevent clodding or lumping together of large numbers of seeds, after which treatment the seeds are ready for planting in the usual way.

If desired some of the fertilizer or other activity controlling agent may be mixed with the plaster of Paris, thus somewhat increasing the supply to the plants, or the chemical agent may all be contained in the plastic coating.

In cases where barley, rice or other seeds have extra thick heavy hulls, I increase the amount of alkali from that given in the formula.

For the application of potassium, magnesium, sulfur, sodium, etc., to seeds, the general method of treatment is the same, though specific carrying out of the details may vary considerably.

It should be noted that while plaster of Paris is specifically mentioned as a suitable material for coating the treated seeds or for carrying a supply of the activity promoting agent, other cementitious materials may be employed which are of a sufficiently porous nature to break down in the soil and liberate the seed in sprouting, or other non-porous coatings may be employed, such for instance as gelatine, which would have the property of protecting the impregnated seed against loss of active agent through rains incurred shortly after planting, or which could in itself hold a store of the active agent available to the seed yet soften or distintegrate through soil action sufficiently to permit sprouting of the seed.

Attention is also called to the fact that although the invention has particular reference to the treatment of seeds to promote growth of plants or increase the quality or quantity of the product thereof, it is primarily a new method of supplying the plant with any elements or compounds which the plant may require for any purpose of development or to combat disease either specific or general, for plants undernourished in regard to any element or deficient or diseased in so far as their subnormal activity or development is concerned. It therefore follows that my invention provides for treatment of the seeds with any chemical agents, medicaments or toxins to modify or increase any desired activity of the plant for any purpose whatsoever, and any such adaptation of my invention is intended to be covered in the appended claims.

I claim:

1. A fertilizing solution for treating a seed having a sufficiently high concentration of salts to substantially prevent absorption of moisture by the seed.

2. A fertilizing solution for treating a seed having a sufficiently high concentration of salts to raise the specific gravity of the liquid to exceed that of the seed for substantially preventing absorption of moisture by the seed.

3. A fertilizing solution for treating a barley seed or seeds of similar specific gravity comprising a compound of phosphorous of four molal concentration.

4. As a fertilizing medium for preparing seed for planting, a highly concentrated chemical fertilizing solution free from nitrogen compounds.

WILLIAM F. GERICKE.